ELECTRONIC INDICATOR CIRCUIT

Original Filed Aug. 17, 1959

INVENTORS
DAVID GLASER
ARPAD SOMLYODY
PHILIP L. NACE
BY Robert A. Green
ATTORNEY INVENTOR.
DAVID GLASER
ARPAD SOMLYODY
PHILIP L. NACE
BY Robert A. Green
ATTORNEY United States Patent Office 3,227,922
Patented Jan. 4, 1966

3,227,922
ELECTRONIC INDICATOR CIRCUIT

David Glaser, Greenbrook, Arpad Somlyody, Raritan, and Philip L. Nace, Berkeley Heights, N.J., assignors to Burroughs Corporation, Detroit, Mich., a corporation of Michigan Continuation of abandoned application Ser. No. 78,201, Dec. 22, 1960, which is a continuation of abandoned application Ser. No. 834,308, Aug. 17, 1959. This application Nov. 25, 1964, Ser. No. 425,983
14 Claims. (Cl. 315—135)

This invention relates to electronic indicator circuits and, particularly, to circuits using semiconductor switches for operating electronic indicator devices. The invention also relates to protective circuits for semiconductor switching devices.

This application is a continuation of application Serial No. 78,201 filed December 22, 1960, now abandoned, as a continuation of application Serial No. 834,308 filed August 17, 1959, and now abandoned.

At the present time and for a long time past, there has been a trend toward miniaturization of electronic equipment, and semiconductor devices such as transistors have stimulated and promoted this trend. There are many electronic applications in which transistor devices have been substituted for larger devices to operate, drive, switch, or otherwise control other special purpose equipment. In accordance with this trend, there has been a need for a circuit in which transistors, particularly inexpensive, non-critical transistors, could be used as switches to operate or turn on an electronic indicator device such as the type 6844A cold cathode, gaseous indicator tube.

This type of indicator tube includes a plurality of cathode glow electrodes and an anode mounted in a gas-filled envelope. When a proper electrical potential is applied between a cathode and the anode, then the cathode exhibits cathode glow, that is, a sheath of gas surrounding the cathode glows. In the present state of the electronic arts in which transistors are widely used, it is normal to expect to use transistors in a suitable circuit to operate a multi-cathode indicator tube. In such a circuit, it would normally be expected that one transistor would be provided to drive each cathode and that the collector or output electrode of each transistor would be connected to one cathode electrode. In the operation of such a circuit, as each transistor is turned on, it applies a suitable voltage to the appropriate cathode of the indicator tube and the cathode exhibits cathode glow.

Since, in gaseous indicator tubes of the type under consideration, a negative pulse is used to turn on a glow cathode, the transistors would be NPN transistors. It is known that, when one cathode of a multi-cathode glow tube is glowing, the other cathodes, which are not glowing, may assume a wide range of potentials from the potential of the glowing cathode to the potential of the anode, depending primarily on their physical proximity to the glowing cathode. Thus, some cathodes may assume a relatively high potential which may be of the order of 100 volts positive. Such a potential, applied to a collector electrode of an NPN transistor, reverse biases the collector and would ordinarily cause large currents to flow, whereby the power rating of the transistor would be exceeded and the transistor would be destroyed. Thus, in such a circuit, one would expect to use transistors having a high collector reverse voltage or power rating and suitable auxiliary circuitry for limiting collector current to a safe level. Such transistors are relatively expensive, certainly too expensive for use in an electronic package to be produced for a mass market, and any auxiliary circuitry required would be an undesirable added expense.

Another opportunity for applying relatively high reverse potential to the collector electrodes of the driving transistors arises when it is desired to apply a pre-bias potential to each of the glow cathodes. A pre-bias potential is used, in effect, to prime the cathodes so that only a relatively small signal pulse is required to actually turn on a cathode. Such a pre-bias potential, in tubes of the type under consideration, may be generally in the range of 50 to 100 volts positive and would be applied directly to each cathode and thus directly to each collector electrode of the driving transistors. Here too, means must be provided to allow the transistors to withstand the high pre-bias voltages.

Accordingly, the principles and objects of the invention are directed toward the provision of improved circuits for combining semiconductor switches and electronic indicator devices having a plurality of glow cathodes in a single gas-filled envelope, with the semiconductor switches being used to turn on the glow cathodes.

The objects of the invention are also concerned with the provision of improved circuits including transistor switches for operating cold cathode gaseous electronic indicator devices which have multiple glow cathodes in a single gas-filled envelope and having comparatively high characteristic impedances and operating voltages.

The objects of the present invention also relate to the provision of a new and novel circuit of extreme simplicity using transistors for driving or turning on the cathodes of a multi-cathode gaseous glow tube in which the transistors may be inexpensive and non-critical and have a reverse collector voltage rating which is lower than the voltages which may be applied to the collectors in the circuit during operation thereof. In addition, the power rating of the transistors may be lower than the power dissipation which might be expected if the principles of the invention did not operate.

In brief, the circuit of the invention includes a separate semiconductor switching device, such as a transistor, for each cathode glow electrode of a multi-cathode indicator device with the collector or output electrode of each transistor switch being coupled directly to one glow cathode. Each cathode is caused to glow separately when a suitable voltage pulse is applied to it by its transistor. The present invention provides the unexpected and unobvious teaching that, even though reverse voltages are applied to a collector electrode which exceed the voltage rating of the transistor so that damaging currents would be expected to flow, the glow cathode to which a transistor is connected, acts as a non-linear resistance and as a protective current-limiting load for the transistor and prevents damaging currents from flowing. Thus, inexpensive, non-critical transistors having low collector reverse voltage rating may be employed.

Thus, in effect, the present invention also provides an arrangement for protecting a transistor when higher-than-rated reverse collector voltages are applied thereto during normal operation of the transistor and excessive power might be dissipated, the protective means comprising essentially a non-linear resistive load for the transistor which limits current flow and causes current flow to decrease as voltage on the collector of the transistor increases.

The invention is described in greater detail by reference to the drawing in which.

Figure 1:
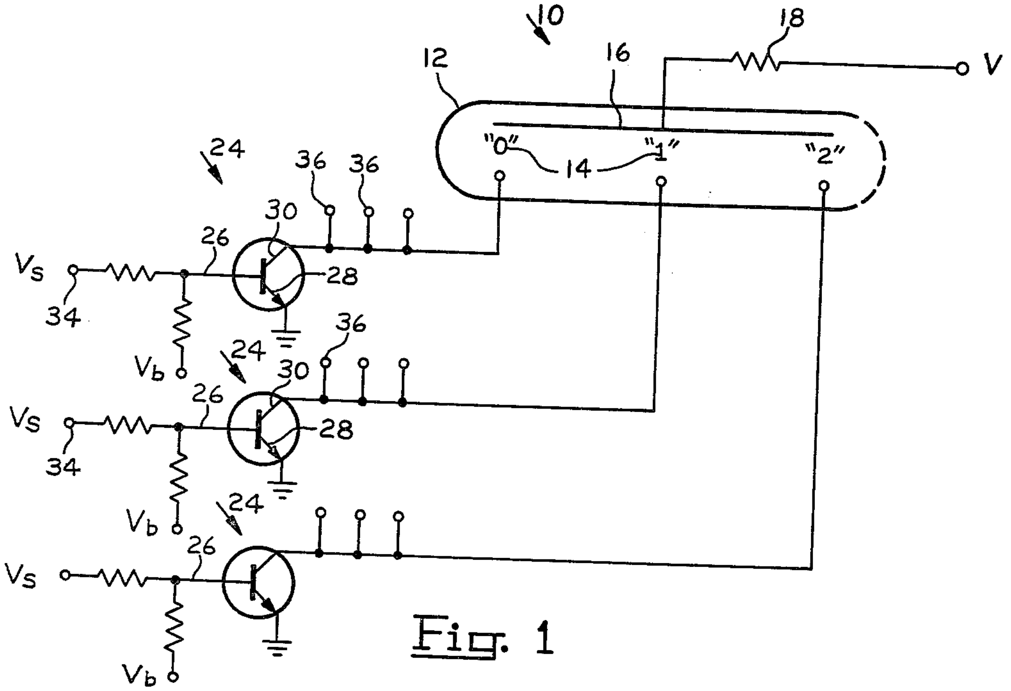
FIG. 1 is a schematic representation of a circuit embodying the invention.

Referring to FIG. 1, numeral 10 designates an indicator device such as a type 6844A cold cathode gaseous glow tube. The tube includes an envelope 12 which contains a gas such as neon and a plurality of cathode glow electrodes 14 which may be in the form of numerals, letters, or the like, three of which are shown. The tube also includes an anode electrode 16 which is connected through a suitable current-limiting resistor 18 to a source of positive D.C. potential V.

Each cathode electrode 14 is connected to a semiconductor switch or driver which, for purposes of illustration, is shown as an NPN transistor 24 which includes a base electrode 26, an emitter electrode 28, and a collector electrode 30. The base electrode 26 is connected through a resistor 32 to a source of a small negative D.C. bias voltage V*b*. The base electrode is also provided with a terminal 34 which may be connected to a source of a positive switching voltage *Vs*. The emitter electrode 28 is connected to ground, and the collector electrode 30 of each transistor is connected to one of the cathode glow electrodes 14 of the tube 10.

In operation of the invention, the transistors are adapted to control the operation of the glow cathodes of tube 10, that is, each transisor is adapted, when conducting, to cause a cathode electrode to glow and, when not conducting, to prevent a cathode from glowing. Thus, a cathode glows when its transistor applies ground potential thereto and it does not glow when it is at a certain positive potential with respect to ground. The operation of cold cathode glow tubes is well known and need not be described in great detail.

In the circuit of FIG. 1, with respect to each transistor, when the transistor is cut off, the base electrode 26 is at a negative potential, the emitter electrode 28 is at ground potential, and the collector electrode 30 is at a positive potential. When it is desired to cause one of the cathode electrodes 14 to glow, a positive voltage V*s* is applied at the terminal 34 of the transistor 24 which is connected to the desired glow cathode. This positive voltage is sufficient to overcome the reverse bias of the transistor and causes the transistor to conduct, and the flow of current from the collector to the emitter applies approximately ground potential to the selected cathode to cause it to glow. Removal of the positive voltage at the terminal 34 reverse-biases the transistor and returns the circuit to the quiescent condition with no cathode glow.

If desired, each of the transistors may be used to operate a plurality of indicator tubes similar to tube 10. For such use, each collector electrode is provided with a plurality of output terminals 36, each one of which is connected to the corresponding cathode electrode of another indicator tube.

The problem solved by the present invention arises when one glow cathode is turned on and exhibits cathode glow and the others do not glow. When the glow tube is in this condition, the cathodes which are turned off generally assume a positive potential which is automatically also applied to the collector electrodes of the transistors to which they are connected. This potential, from the standpoint of the collector electrodes, is relatively high and may be in the range of, for example 45 to 100 volts or more. Potentials of this magnitude applied to the collector electrode of a typical, non-critical and inexpensive NPN transistor would oridinarily exceed the reverse voltage rating of the transistor and the resulting excessive current flow would destroy the transistor due to excessive power dissipation. However, according to the invention, the cathode electrodes which do not glow act as current-limiting loads for their corresponding collectors, and more importantly, these cathode electrodes which do not glow have a non-linear resistance characteristic so that the higher the potential applied to them, the lower current which they allow to flow. Thus, each transistor is protected by its cathode electrode, even though potentials higher than the rated collector potentials are applied thereto.

Figure 3:
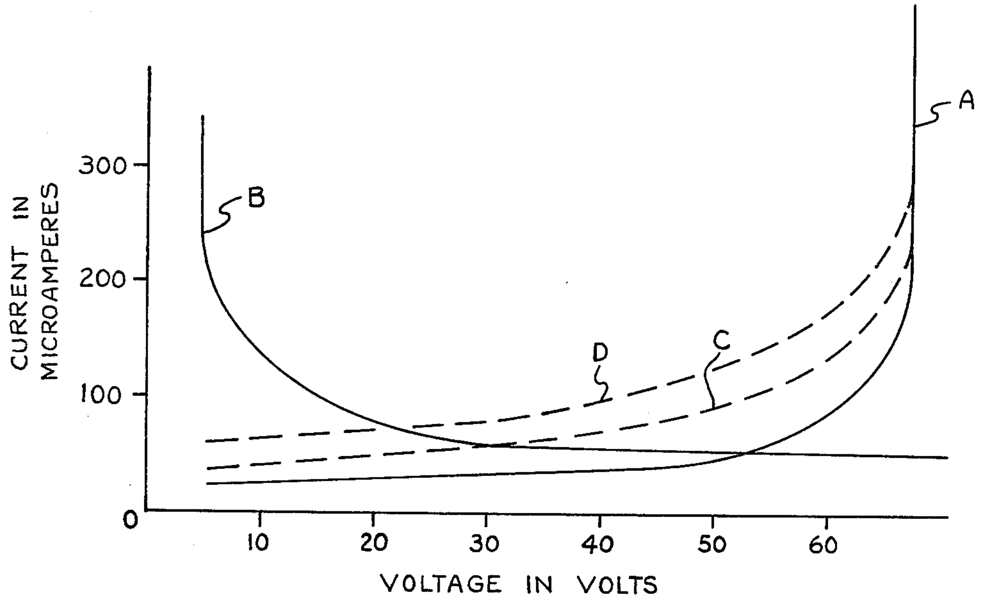
FIG. 3 is a graph showing the reverse voltage-current characteristic of a typical NPN transistor and the current-voltage characteristic of a typical non-glowing cathode of a multi-cathode indicator tube with one cathode of the tube glowing.

The curves shown in FIG. 3 illustrate the operation of the invention. Curve A represents the characteric current which flows as the reverse voltage applied to a typical germanium transistor collector electrode varies. Curve B shows the current which flows as the voltage varies on a non-glowing or "off" cathode in a multicathode glow tube having one of its cathodes glowing. It can be seen that the two curves cross at a point which represents a relatively large voltage, which may be larger than the collector rated voltage, but which is related to a low and safe current for a typical transistor.

Figure 2:
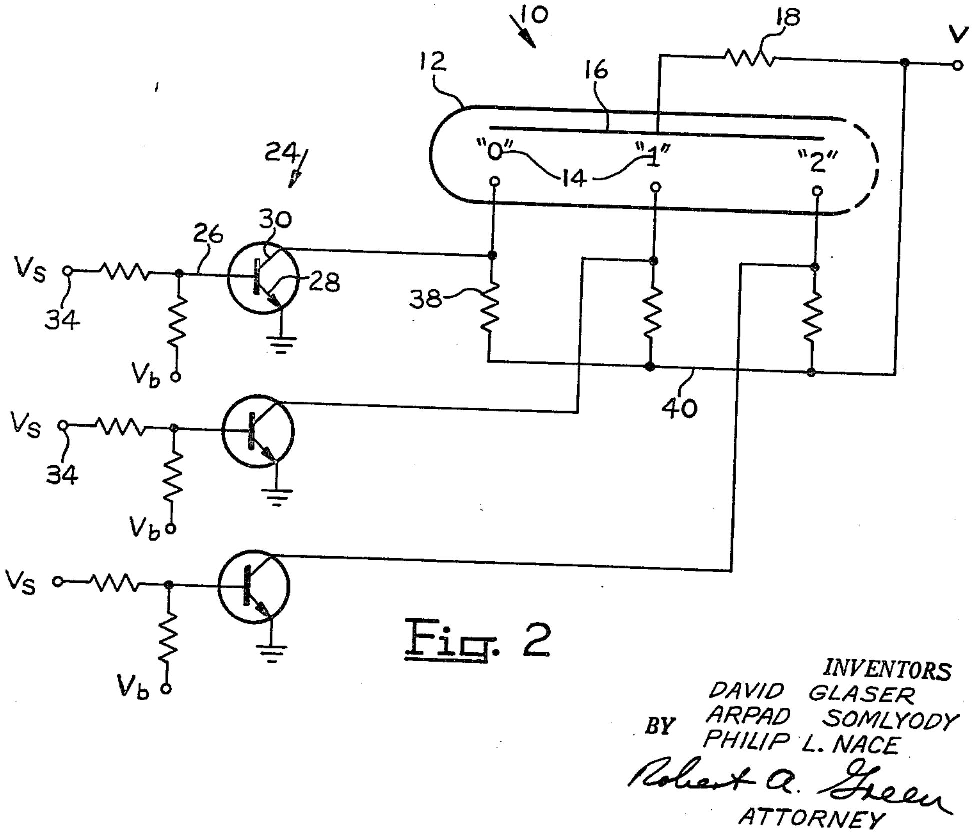
FIG. 2 is a schematic representation of a circuit embodying a modification of the invention.

Under some circumstances, a transistor may have excessively high leakage curent ($I_{CBO}$) either due to exceptionally poor manufacture or due to operation at high temperature or the like. Such currents are not damaging to the transistor; however, they might be so large that they would interfere with normal glow tube operation. Thus, leakage current might be so large that cathode electrodes which should not be glowing might be reduced to such a low potential that they would exhibit a slight but objectionable glow in the background of the one desired glowing cathode. The circuit of FIG. 2 provides means for compensating for excessive transistor leakage current. The circuit of FIG. 2 includes all of the elements of FIG. 1 and, in addition, each glow cathode 14 is coupled through a resistor 38 to a common bus 40 which is connected to the power supply V.

The reverse voltage-current characteristic curve of the transistors of FIGS. 1 and 2 at different temperatures is shown in dashed lines in FIG. 3. The curves C and D represents the characteristic at successively higher temperatures than represented by curve A. The resistors 38 (FIG. 2) allow a slightly larger collector current to flow while maintaining the off-cathodes at a suitable positive potential to prevent them from glowing. The cathodes of the tube 10 (FIG. 2) also operate in the manner described above as current-limiting loads for their respective transistors. The circuit of FIG. 2 has the auxiliary advantage that a selected pre-bias voltage in a type applied to the cathode electrodes by proper selection of the resistors 38. A typical pre-bias voltage in a type 6844 tube is about 50 volts. It is to be noted that only one power supply is required in the circuit of FIG. 2 for the glow tube 10 and the transistors 24.

In one typical operating circuit similar to that of FIG. 2, the following circuit elements and voltages were employed:

| | | |
|---|---|---|
| Transistor **24** | | 2N34 |
| **R18** | K ohms | 6.2 |
| **R38** | megohms | 1.5 |
| **R32** | K ohms | 10 |
| V | volts | 170 |
| $V_b$ | do | 1.5 |

The present invention thus provides a novel circuit using semiconductor devices as switches or drivers for operating the cathodes of a multi-cathode cold cathode gaseous indicator tube. The invention also provides a novel arrangement for protecting transistors although higher-than-rated reverse collector voltages might be applied thereto during operation.

Various modifications which may be made within the scope of the invention will occur to those skilled in the art.

What is claimed is:

1. An electronic character indicator circuit including a cold cathode gaseous indicator tube comprising a gas-filled envelope containing an anode electrode and a plurality of cathode glow electrodes in the form of characters, each cathode being adapted to glow with the application of a relatively high potential between it and said anode, means coupled to said anode for applying relatively high operating potential thereto whereby cathode electrodes which are not glowing tend to assume a potential approximately equal to said operating potential due to the flow of leakage current thereto from said anode through the gas filling in said envelope, a separate semiconductor switching device coupled directly and without intervening impedance elements to each cathode electrode for causing the cathode to glow, each semiconductor device thus being adapted to have applied to its said relatively high potential of the cathode to which it is connected when the cathode is not glowing, said potential being permissibly considerably higher than the normal rated collector voltage for said semiconductor device and of a magnitude adapted ordinarily to cause excessive leakage current to flow through each semiconductor device, each cathode of said indicator tube when not glowing comprising the load for the semiconductor device to which it is connected and limiting the leakage current flow therethrough whereby said operating potential may be applied to said semiconductor devices without adversely affecting them.

2. An electronic character indicator circuit including a cold cathode gaseous indicator tube comprising a gas-filled envelope containing an anode electrode and a plurality of cathode glow electrodes in the form of characters, each cathode being adapted to glow with the application of a relatively high potential between it and said anode, means coupled to said anode for applying relatively high operating potential thereto whereby cathode electrodes which are not glowing tend to assume a potential approximately equal to said operating potential due to the flow of leakage current thereto from said anode through the gas filling in said envelope, a plurality of transistors each having emitter, base, and collector electrodes, each transistor being coupled by its collector electrode directly and without intervening impedance elements to a glow cathode electrode, each transistor thus being adapted to cause a cathode to glow when it is switched on, each transistor thus being adapted to have applied to its collector electrode said relatively high operating potential of the glow cathode to which it is connected, said potential being permissibly considerably higher than the normal rated collector voltage for said transistor, each cathode of said indicator tube comprising the load for the transistor device to which it is connected and limiting the current flow therethrough whereby higher-than-normal rated voltages may be applied to said transistors without adversely affecting them.

3. The circuit defined in claim 2 wherein said transistors are connected in the common emitter configuration.

4. The circuit defined in claim 2 wherein said transistors are NPN transistors connected in the common emitter configuration.

5. The circuit defined in claim 2 and including means coupled to the base electrode of each transistor for applying input signals thereto.

6. An electronic character indicator comprising a cold cathode gaseous indicator tube having a gas-filled envelope containing an anode and a plurality of glow cathodes each shaped in the form of at least a portion of a character, the glow cathodes being located in gas discharge relation to said anode and in close proximity to one another, means for applying to said anode a predetermined positive potential for establishing a glow discharge contiguous at least one of said cathodes and causing the remaining cathodes to tend to assume a potential approximating said predetermined potential, circuit means for selecting at least one of said cathodes for said glow discharge, said circuit means including a plurality of semiconductor devices each having at least type N, type P and type N zones with one of said N zones connected to one of said glow cathodes, each of said semiconductor devices having a normal breakdown potential which is considerably below said predetermined potential, and an input circuit connected to each of said semiconductor devices for selectively rendering at least one of said devices conductive in response to at least one input signal and thereby causing a glow discharge contiguous the connected glow cathodes, the cathode-to-anode paths through the indicator tube, when their respective cathodes are non-glowing, serving as the load for the connected semiconductor devices and limiting the current flow through such devices.

7. An electronic character indicator as in claim 6 wherein the second N type zone of said semiconductor devices are connected to a reference potential.

8. An electronic character indicator as in claim 7 wherein the semiconductor devices comprise NPN transistors having collector, base and emitter electrodes, wherein the collector electrodes are connected to the respective glow cathodes of the indicator tube, and the input circuit is connected to the base of each of said transistors.

9. An electronic character indicator as in claim 6 wherein the paths through the cathode-to-anode circuits to which the collector electrodes are connected provide the only paths from the collector electrode to said anode.

10. An electronic character indicator as in claim 6 further including a plurality of resistors, one connected across each of the cathode-to-anode circuits of the indicator tube.

11. An electronic character indicator comprising a cold cathode gaseous indicator tube having a gas-filled envelope containing an anode and a plurality of glow cathodes each shaped in the form of at least a portion of a character, the glow cathodes being located in gas discharge relation to said anode and in close proximity to one another, switching means for selectively establishing a closed circuit connection between at least one of said glow cathodes and a reference potential, and circuit means for connecting a predetermined anode potential to the anode of said indicator tube for producing a glow discharge contiguous the cathodes selected by said switching means and causing the non-selected cathodes to tend to assume a potential approximately equal to said anode potential, said switching circuit means including a plurality of semiconductor devices each having at least N type, P type and N type zones, with an N type zone of each such device connected to one of said glow cathodes, at least one zone connected as a control electrode, and at least one connected to said reference potential, each of said semiconductor devices being characterized by a normal breakdown potential which is considerably below said anode potential, and an input circuit connected to the control electrode of each of said semiconductor devices for selectively rendering at least one of said devices conductive and causing a glow discharge contiguous the connected glow cathode, the cathode-to-anode circuit of the nonglowing cathodes comprising the load for the semiconductor devices to which the cathode is connected and limiting the current flow through such device.

12. An electronic indicator including an envelope containing an anode and a plurality of cathodes each shaped in the form of at least a portion of a character, a gaseous atmosphere within said envelope at a pressure capable of sustaining a cathode glow contiguous at least one of said cathodes to exhibit a character upon the application of a suitable glow potential, said indicator being adapted to operate with at least one of said cathodes glowing and the remaining cathodes nonglowing, circuit means for applying a fixed potential to said anode for causing at least one of the cathodes to glow and the remaining cathodes to tend to assume a potential which approximates said anode potential as a consequence of their location proximate the glow region and in the electric field of the applied anode potential, a plurality of gating NPN transistors, one connected to each of said cathodes to enable the cathode to glow when the transistor is turned on, each of said transistors having its collector electrode connected to the cathode without any intervening connection to a potential source and having a normal breakdown voltage substantially lower than the potential assumed by the nonglowing cathodes, and a voltage source connected to said circuit means for supplying potential to both the anode and the collectors of the gating transistors with the impedance between the anode and the nonglowing cathodes serving to limit the current flow through the transistors connected thereto.

13. An electronic character indicator comprising a cold cathode gaseous indicator tube having a gas-filled envelope containing an anode and a plurality of glow cathodes each shaped in the form of at least a portion of a character, the glow cathodes being located in gas discharge relation to said anode and in close proximity to one another, switching means for selectively establishing a closed circuit conncetion between at least one of said glow cathodes and a reference potential, and circuit means for connecting a predetermined anode potential to the anode of said indicator tube for producing a glow discharge contiguous the cathodes selected by said switching means and causing the nonselected cathodes to tend to assume a potential approximately equal to said anode potential, said switching circuit means including a plurality of semiconductor devices each having at least N type, P type and N type zones, with an N type zone of each such device connected as a collector or output electrode to one of said glow cathodes, at least one zone connected as an input control electrode, and at least one connected to said reference potential, each of said semiconductor devices being characterized by a normal breakdown potential which is considerably below said anode potential, and an input circuit connected to the control electrode of each of said semiconductor devices for selectively rendering at least one of said devices conductive and causing a glow discharge contiguous the connected glow cathode, the cathode-to-anode circuit of the nonglowing cathodes comprising the load for the semiconductor devices to which the cathode is connected and limiting the current flow through such device.

14. An electronic character indicator comprising a cold cathode gaseous indicator tube having a gas-filled envelope containing an anode and a plurality of glow cathodes each shaped in the form of at least a portion of a character, the glow cathodes being located in gas discharge relation to said anode and in close proximity to one another, switching means for selectively establishing a closed circuit connection between at least one of said glow cathodes and a reference potential, and circuit means for connecting a predetermined anode potential to the anode of said indicator tube for producing a glow discharge contiguous the cathodes selected by said switching means and causing the nonselected cathodes to tend to assume a potential approximately equal to said anode potential, said switching circuit means including a plurality of semiconductor devices each having at least N type, P type and N type zones separated from each other by P-N junctions, with an N type zone of each such device connected as a collector or output electrode to one of said glow cathodes, an adjacent P type zone connected as an input control electrode, and an N type zone which is adjacent to said P type zone connected to said reference potential, each of said semiconductor devices being characterized by a normal breakdown potential which is considerably below said anode potential, and an input circuit connected to the control electrode of each of said semiconductor devices for selectively rendering at least one of said devices conductive and causing a glow discharge contiguous the connected glow cathode, the cathode-to-anode circuit of the nonglowing cathodes comprising the load for the semiconductor devices to which the cathode is connected and limiting the current flow through such device.

No references cited.

GEORGE N. WESTBY, *Primary Examiner.*